United States Patent [19]

Saito

[11] Patent Number: 5,675,282

[45] Date of Patent: Oct. 7, 1997

[54] CIRCUIT WITH SLEEP MODE HAVING COUNTER

[75] Inventor: Akitoshi Saito, Shizuoka-Ken, Japan

[73] Assignee: Yamaha Corporation, Hamamatsu, Japan

[21] Appl. No.: 512,994

[22] Filed: Aug. 9, 1995

[30] Foreign Application Priority Data

Aug. 9, 1994 [JP] Japan .................................. 6-208014

[51] Int. Cl.$^6$ .............................. H03K 1/04; G05F 11/10
[52] U.S. Cl. ........................ 327/544; 327/387; 327/398
[58] Field of Search ................................... 327/295, 544, 327/387, 398

[56] References Cited

U.S. PATENT DOCUMENTS

| | | | |
|---|---|---|---|
| 5,254,888 | 10/1993 | Lee et al. | 327/544 |
| 5,329,178 | 7/1994 | Burton et al. | 327/544 |
| 5,481,222 | 1/1996 | Utz | 327/544 |

Primary Examiner—Margaret Rose Wambach
Attorney, Agent, or Firm—Loeb & Loeb LLP

[57] ABSTRACT

An integrated circuit has a plurality of circuit elements, each of which is equipped with a power saving device for conserving power. This offers design flexibility to more easily change the number of circuit elements in the integrated circuit. Each circuit element detects the input data with the aid of an input detector circuit. The input detector triggers a timer circuit to measure the time required for the circuit element to process the data. The timer circuit turns on an action flag at the start of the process, and turns off the action flag at the end of the process. When the action flag is on, a switch circuit provides either a clock signal or the power to a main circuit. This allows the main circuit to enter an activation mode. When the action flag is off, the switch circuit either provides a low-speed clock signal or suspends the supply of the clock signal or the power to the main circuit. This allows the main circuit to enter a sleep mode.

5 Claims, 2 Drawing Sheets

CIRCUIT WITH SLEEP MODE HAVING COUNTER

BACKGROUND OF THE INVENTION

1. Field of the Invention

This invention relates to an integrated circuit having a plurality of circuit elements, in which circuit elements that are not in use in the integrated circuit are placed in a sleep mode to decrease the power consumption of the integrated circuit.

2. Related Art

Conventionally, in order to decrease the power consumption of a large-scale integrated (LSI) circuit, the power or a clock signal to an inactive LSI, is suspended. This places the entire LSI circuit in a sleep mode. Hence, the LSI is not allowed to enter the sleep mode if at least one of the circuit elements contained within the LSI is in operation. Thus, this method is not suitable for the fine control of the power consumption.

In another typical approach, an instruction control unit (ICU) collectively controls the operations of the circuit elements in the LSI circuit such that the circuit elements which are not in operation are individually placed in a sleep mode. This results in power saving control being performed for each and every circuit element in the LSI. Nonetheless, the ICU must maintain a heavy control burden to conserve power, which requires an intricate design for the ICU. As a result, if the number of circuit elements in the LSI circuit are changed, the ICU design must also be changed.

SUMMARY OF THE DISCLOSURE

In view of the foregoing, an object of preferred embodiments of the present invention is to provide an integrated circuit, such as an LSI circuit, having a power saving device in which the power consumption control is performed by each circuit element, so that the integrated circuit can flexibly adapt to the changes in the number of circuit elements without re-designing the ICU.

In accordance with an embodiment of the present invention, an integrated circuit adapted to save power has a plurality of circuit elements. Each circuit element that performs a predetermined operation is placed in an activation mode, and those circuit elements which are not in current use are placed in a sleep mode to decrease the power consumption. Each circuit element enters the activation mode upon detection of input data supplied to the circuit element, and enters a sleep mode upon termination of the predetermined operation with the supplied input data. Each circuit element has an input detecting circuit that detects input data to the circuit element, a timer circuit that outputs a termination signal and that determines a time period required for the circuit element to complete the predetermined operation after the input detecting circuit detects the supplied input data, and a clock control circuit for supplying a clock signal to the circuit element. The clock control circuit suspends the clock signal upon receiving the termination signal from the timer circuit so that the circuit element switches from the activation mode to the sleep mode. In particular embodiments, the clock control circuit may also include a frequency dividing circuit that transforms the clock signal into a low speed clock signal. The low speed clock signal is then provided to the circuit element upon receiving the termination signal from the timer circuit.

In further embodiments, the circuit element may include a delay circuit that delays the transition from the activation mode to the sleep mode after receiving the termination signal according to a predetermined delay. The delay circuit includes a register for storing a value of the predetermined delay period, a counter that counts the clock signal and generates a count value, and a comparator that compares values from the register and the counter. The counter starts counting upon receiving the termination signal from the timer and provides the count value to the comparator. The comparator compares the count value with the predetermined delay period in the register and provides a flag to the clock control circuit when the count value from the counter matches the value of the predetermined delay period from the register. The predetermined delay value which is stored in the register can be set externally.

In accordance with a second embodiment of the present invention, an integrated circuit adapted to save power and operable with a power source has a plurality of circuit elements. Each circuit element that performs a predetermined operation is placed in an activation mode, and those circuit elements which are not in current use are placed in a sleep mode to decrease the power consumption. Each circuit element has an input detecting circuit that detects input data supplied to the circuit element, a timer circuit that outputs a termination signal and that determines a time period required for the circuit element to complete the predetermined operation after the input detecting circuit detects the supplied input data, and a power supply control circuit that supplies the power to the circuit element. The power supply control circuit suspends the power to the circuit element upon receiving the termination signal from the timer circuit so that the circuit element switches from the activation mode to the sleep mode.

In particular embodiments, some of the circuit elements may require a certain period of time to enter the activation mode. The delay caused by these circuit elements may allow unprocessed data to be transferred to subsequent circuit elements. To prevent this problem, each circuit element generates a flag upon terminating the predetermined operation while in the activation mode.

In accordance with a third embodiment of the present invention, a circuit element may have both a power supply control circuit and a clock control circuit that control both the clock signal and the power, respectively, to provide more effective power management of the circuit element.

Other features and advantages of the invention will become apparent from the following detailed description, taken in conjunction with the accompanying drawings which illustrate, by way of example, various features of embodiments of the invention.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION OF THE PREFERRED EMBODIMENTS

Figure 1:
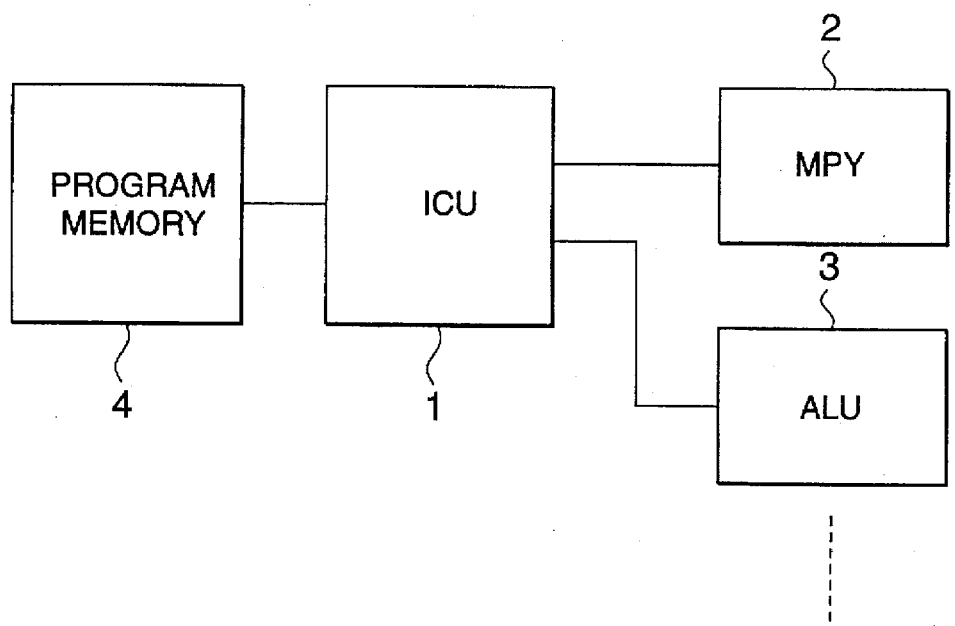
FIG. 1 is a block diagram of an integrated circuit.

As shown in the drawings for purposes of illustration, the invention is embodied in an integrated circuit. The integrated circuit is used, for instance, in a digital signal processor (DSP) or as part of other circuits.

The integrated circuit shown in FIG. 1 is formed on a single chip that comprises an ICU 1, a plurality of circuit elements, such as a multiplier (MPY) 2, an arithmetic logic unit (ALU) 3, a multiplexer (not shown), a memory control (not shown), etc., which are controlled by the ICU 1, and a program memory 4 which stores a control program for the ICU 1.

Figure 2:
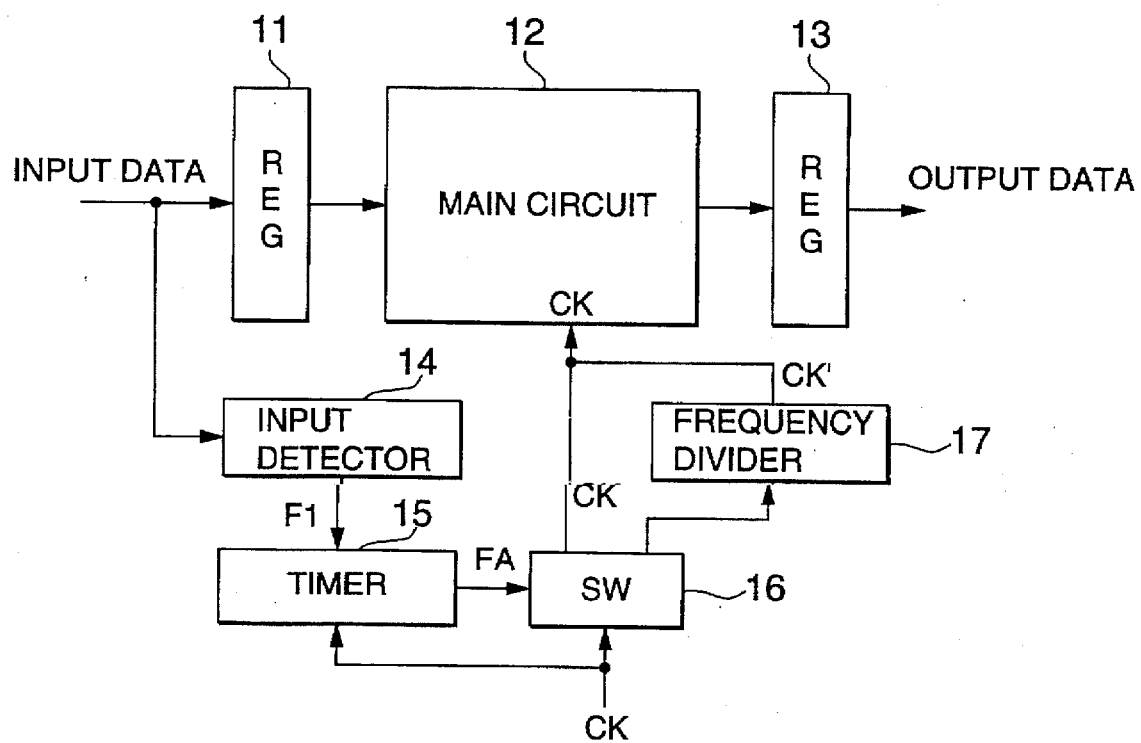
FIG. 2 is a block diagram of a circuit element according to a first embodiment of the present invention for use in the integrated circuit shown in FIG. 1.

The circuit elements, such as the MPY 2 and the ALU 3, are each formed as shown in FIG. 2, in accordance with a first embodiment of the present invention. Input data is initially supplied to and stored in a register 11, and then supplied to a main circuit 12. In the main circuit 12, the input data is subjected to various data processing operations, such as an arithmetic operation or the like. The processed data from the main circuit 12 is then supplied to a second register 13, which outputs the processed data. The input data is also supplied to an input detector 14. When the input data is detected, the input detector 14 sets a data input flag FI which functions like a trigger signal for a timer 15. Upon being triggered by the data input flag FI, the timer 15 sets an action flag FA, which determines a time period required for the main circuit 12 to process the input data and counts a clock signal CK. The timer 15 turns off the action flag FA when the number of clock signals CK reach the time period required for the main circuit to process the input data. The action flag FA is supplied as a change-over signal to a switch circuit 16. When the action flag FA is set high, the switch circuit 16 applies the clock signal CK to the main circuit 12. When the action flag FA is set low, the switch circuit 16 causes a low-speed clock signal CK' to be applied to the main circuit 12. The low-speed clock signal CK' is obtained by subjecting the clock signal CK, for example, to frequency division in a frequency divider 17.

In preferred embodiments, when the clock signal CK is provided to the main circuit 12, the main circuit 12 is in an activation mode (i.e., a normal operating mode) and performs its predetermined operation, such as an arithmetic operation or the like. When the low-speed clock signal CK' is provided to the main circuit 12, the main circuit 12 is placed in a sleep mode. In alternative embodiments, the main circuit 12 may be placed in the sleep mode by completely suspending the supply of the clock signal CK to the main circuit 12.

As described above, the circuit element enters the activation mode upon receiving input data, and concurrently, the timer determines the processing time based on the type of processing that needs to be performed by the main circuit 12. After the processing time has elapsed, the circuit element enters the sleep mode without the aid of the ICU 1. Thus, in accordance with embodiments of the present invention, a controller, such as an ICU, is not needed to manage power for the integrated circuit. Therefore, the integrated circuit can flexibly adapt to the changes in the number of circuit elements without redesigning the ICU.

Figure 3:
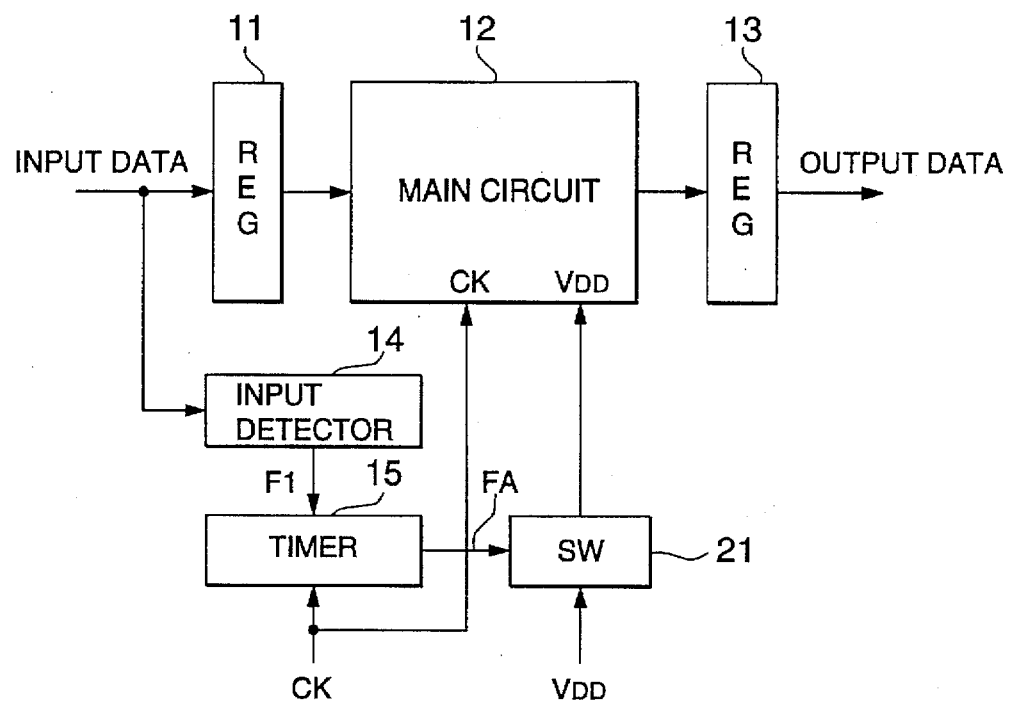
FIG. 3 is a block diagram of a circuit element according to a second embodiment of the present invention for use in the integrated circuit shown in FIG. 1.

FIG. 3 is a block diagram showing a circuit element according to a second embodiment of the present invention. The circuit element shown in FIG. 3 is different from FIG. 2, because a switch circuit 21 controls the application of a supply voltage VDD, instead of the clock signal CK, to the main circuit 12. The operation of the embodiment shown in FIG. 3 is identical to that of FIG. 2, except that during the activation mode, the switch circuit 21 provides the supply voltage VDD to main circuit 12, and during the sleep mode, the switch circuit 21 suspends the application of the supply voltage VDD to the main circuit, Removing the supply voltage VDD completely shuts off the main circuit 12.

Alternatively, the circuit element may be modified so that the supply voltage VDD may be decreased, instead of being completely suspended from the main circuit 12. In further embodiments, the supply voltage control may be combined with the above-described clock signal control to provide more efficient power conservation.

Figure 4:
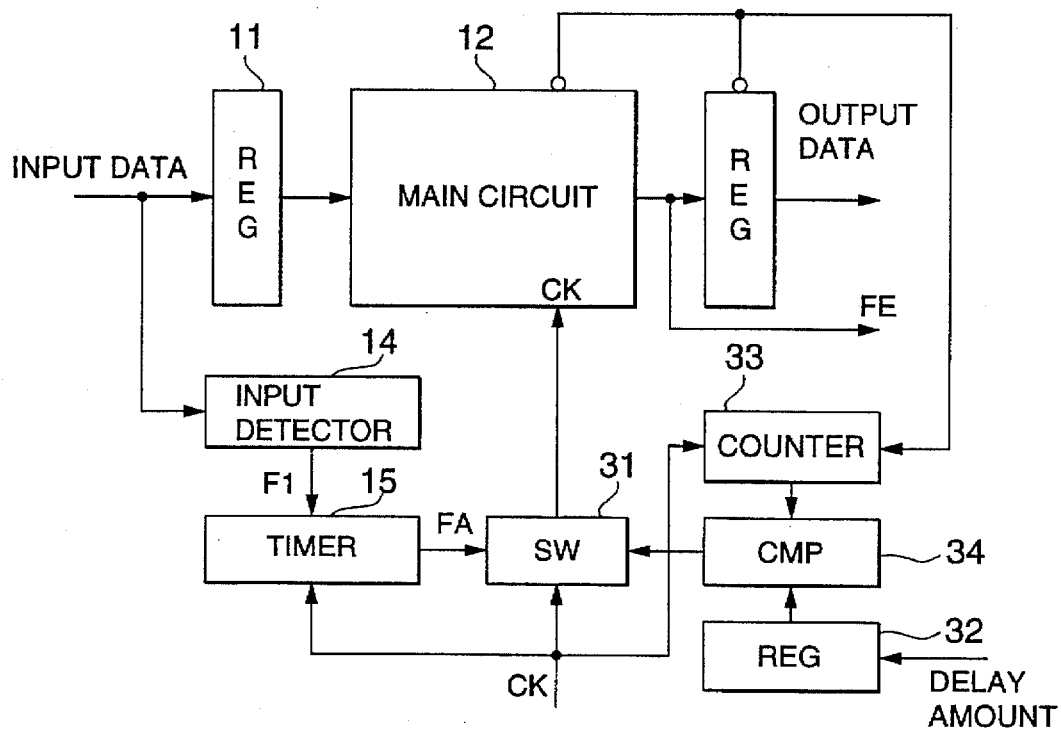
FIG. 4 is a block diagram of a circuit element according to a third embodiment of the present invention for use in the integrated circuit shown in FIG. 1.

FIG. 4 is a block diagram showing a circuit element according to a third embodiment of the present invention. When the timer 15 is set according to the actual processing time of the main circuit 12, the main circuit 12 enters the sleep mode immediately after processing the supplied input data. For each set of the input data provided to the circuit element, the main circuit 12 may alternate between the activation and the sleep modes. However, if the circuit element requires a period of time each time it enters the activation mode, then entering the sleep mode immediately after the completion of the required processing may increase the processing time when the main circuit 12 is frequently utilized. This potential problem may be resolved by not immediately suspending the supply of the clock signal CK after the lapse of the time set by the timer 15. As shown in FIG. 4, a counter 33 counts up to the value set in a register 32, so that suspension of the clock signal CK is postponed until the output of a comparator 34 is set to a certain state, such as "1." The delay in the suspension of the clock signal CK depends on the predetermined value set in the register 32. In particular embodiments, the value of the register 32 can be set externally to a desired value by an operator according to the various types of data processing operations that will be performed by the main circuit 12.

The embodiment shown in FIG. 4 may also be used in conjunction with the embodiment shown in FIG. 3. For example, the output of the comparator 34 may be provided to the switch circuit 21 to control the supply voltage VDD that is supplied to the main circuit 12. In this configuration, the suspension of the supply of the voltage supply VDD is delayed until the output of the comparator 34 is set to a certain state, such as "1."

If the circuit element requires a period of time to enter the activation mode, the processing time to output data may be different depending on whether the circuit element is in the activation mode or in the sleep mode. This can cause problems when output data is supplied to succeeding circuit element. To substantially eliminate the difference in the processing speed of the circuit element because of the different mode, an index is provided to indicate when the next circuit element or device should receive the data. The index may take a form of an operation termination flag FE (see FIG. 4) generated by the circuit element upon completion of the predetermined operation of the main circuit 12.

In the preferred embodiments, the timer 15 measures the time required for the circuit element to process the data, and outputs the termination signal. However, in alternative embodiments, the circuit element may be modified to detect the termination of the data processing operation and to output the termination signal when the termination of the operation is detected. Thus, a calculation termination flag is provided to the output port or to a register so that the timer circuit in the circuit element may be eliminated.

While the description above refers to particular embodiments of the present invention, it will be understood that many modifications may be made without departing from the spirit thereof. For example, while the preferred embodiments are described with reference to the DSP in which the circuit elements are controlled by the ICU, the concept of the invention is applicable to other types of LSI circuits, such as a micro processor or the like. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An integrated circuit configured to save power and operable with a clock signal, the integrated circuit comprising:

a plurality of circuit elements, wherein each of the plurality of circuit elements that performs a predetermined operation is independently placed in an activation mode, and any of the plurality circuit elements which are not in use are independently placed in a sleep mode to save power, wherein each of the plurality of circuit elements includes:

an input detect circuit that detects input data supplied to the circuit element;

a timer circuit that determines a time period required for the circuit element to complete the predetermined operation after the input detecting circuit detects the supplied input data and for outputting a termination signal;

a clock control circuit that supplies the clock signal to the circuit element, wherein the clock control circuit suspends the clock signal upon receiving the termination signal from the timer circuit so that the circuit element transitions from the activation mode to the sleep mode; and a delay circuit that delays the transition, according to a predetermined delay period, from the activation mode to the sleep mode after receiving the termination signal from the timer circuit, wherein the delay circuit includes:

a register that stores a value of the predetermined delay period;

a counter that counts the clock signal and generates a count value; and a comparator that compares values from the register and the counter, wherein the counter starts counting upon receiving the termination signal from the timer and provides the count value to the comparator for comparison with the value of predetermined delay period in the register.

2. An integrated circuit according to claim 1, wherein the comparator provides a flag to the clock control means when the count value from the counter matches the value of the predetermined delay period from the register.

3. An integrated circuit configured to save power and operable with a power source that provides power, the integrated circuit comprising:

a plurality of circuit elements, wherein each of the plurality of circuit elements that performs a predetermined operation is independently placed in an activation mode, and any of the plurality circuit elements which are not in use are independently placed in a sleep mode to save power, wherein each of the plurality of circuit elements includes:

an input detect circuit that detects input data supplied to the circuit element;

a timer circuit that determines a time period required for the circuit element to complete the predetermined operation after the input detecting circuit detects the supplied input data and for outputting a termination signal;

a power supply control circuit that provides the power to the circuit element, wherein the power supply control circuit suspends the supply of the power to the circuit element upon receiving the termination signal from the timer circuit so that the circuit element transitions from the activation mode to the sleep mode; and a delay circuit that delays the transition, according to a predetermined delay period, from the activation mode to the sleep mode after receiving the termination signal from the timer circuit, wherein the delay circuit includes:

a register that stores a value of the predetermined delay period;

a counter that counts the clock signal and generates a count value; and a comparator that compares values from the register and the counter, wherein the counter starts counting upon receiving the termination signal from the timer and provides the count value to the comparator for comparison with the value of predetermined delay period in the register.

4. A circuit element configured to save power and operable with a clock signal, and suitable for used in an integrated circuit, wherein the circuit element is independently placed in an activation mode when performing a predetermined operation and is independently placed in a sleep mode to save power when the circuit element is not use, the circuit element comprising:

an input detect circuit that detects input data supplied to the circuit element;

a timer circuit that determines a time period required for the circuit element to complete the predetermined operation after the input detecting circuit detects the supplied input data and for outputting a termination signal;

a clock control circuit that supplies the clock signal to the circuit element, wherein the clock control circuit suspends the clock signal upon receiving the termination signal from the timer circuit so that the circuit element transitions from the activation mode to the sleep mode; and a delay circuit that delays the transition, according to a predetermined delay period, from the activation mode to the sleep mode after receiving the termination signal from the timer circuit, wherein the delay circuit includes:

a register that stores a value of the predetermined delay period;

a counter that counts the clock signal and generates a count value; and a comparator that compares values from the register and the counter, wherein the counter starts counting upon receiving the termination signal from the timer and provides the count value to the comparator for comparison with the value of predetermined delay period in the register.

5. A circuit element according to claim 4, wherein the comparator provides a flag to the clock control means when the count value from the counter matches the value of the predetermined delay period from the register.

* * * * *